(12) United States Patent
Song

(10) Patent No.: US 7,715,089 B2
(45) Date of Patent: May 11, 2010

(54) ELECTROPHORETIC DISPLAY PANEL AND METHOD OF FABRICATING THE SAME

(75) Inventor: Keun Kyu Song, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 117 days.

(21) Appl. No.: 11/836,687

(22) Filed: Aug. 9, 2007

(65) Prior Publication Data
US 2008/0037106 A1  Feb. 14, 2008

(30) Foreign Application Priority Data
Aug. 14, 2006 (KR) .................. 10-2006-0076698

(51) Int. Cl.
G02B 26/00 (2006.01)
G02F 1/133 (2006.01)
G03G 13/00 (2006.01)
(52) U.S. Cl. .................. 359/296; 349/33; 430/31
(58) Field of Classification Search .......... 359/296; 345/84–85, 107; 430/31–32; 347/111–112; 399/131; 204/600; 349/33
See application file for complete search history.

(56) References Cited

U.S. PATENT DOCUMENTS 6,373,461 B1 * 4/2002 Hasegawa et al. ........... 345/107

2005/0099559 A1 * 5/2005 Lee et al. .................. 349/113
2006/0070651 A1 * 4/2006 Kang et al. ................ 136/256
2007/0132713 A1 * 6/2007 Seo et al. ................... 345/107

FOREIGN PATENT DOCUMENTS

| JP | 2005049771 A | 2/2005 |
| JP | 2006058579 A | 3/2006 |
| KR | 10-2006-0011157 A | 2/2006 |
| KR | 10-2006-0030630 A | 4/2006 |

* cited by examiner

Primary Examiner—Scott J Sugarman
Assistant Examiner—Dawayne A Pinkney
(74) Attorney, Agent, or Firm—Innovation Counsel LLP

(57) ABSTRACT

An electrophoretic display panel with a fast response speed and its fabrication method are disclosed. The electrophoretic display panel includes a first array substrate including a gate line and a data line extending perpendicularly to each other, a thin film transistor connected to the gate line and the data line, and a pixel electrode electrically connected to the thin film transistor. The electrophoretic display panel also includes a second array substrate coupled the first array substrate and including a common electrode capable of forming an electric field with the pixel electrode, a spacer formed on at least one of the first array substrate or the second array substrate to define a charging region in the pixel region; and an electrophoretic medium in the charging region between the first and second array substrates.

26 Claims, 13 Drawing Sheets

ELECTROPHORETIC DISPLAY PANEL AND METHOD OF FABRICATING THE SAME

CROSS-REFERENCE TO RELATED APPLICATION

This application claims priority from Korean Patent Application No. 2006-76698 filed in the Korean Patent Office on Aug. 14, 2006, the entire content of which is incorporated by reference herein.

BACKGROUND OF THE INVENTION

1. Field of the Invention

The present invention relates generally to an electrophoretic display panel, and more particularly to an electrophoretic display panel having an electrophoretic medium with a fast response speed and driven in an active matrix mode and a method for fabricating the same.

2. Description of the Related Art

A typical electrophoretic display device comprises microcapsules which contain an electronic ink with black and white pigments charged with positive polarities and negative polarities. The electrophoretic display device displays an image such that locations of black and white pigment particles are changed by an electric field. Compared to a liquid crystal display device, the electrophoretic display device has a high reflectivity and contrast ratio. Furthermore, unlike a liquid crystal device, an electrophoretic display device does not have the limitations of a viewing angle; thus, a user can comfortably see a displayed image from any angle as though the image is on paper. In addition, the electrophoretic display device has low power consumption since it has bistable characteristics of black and white and it can maintain an image without continuous application of a voltage.

The electrophoretic display device is usually driven in a passive matrix mode. However, the electrophoretic display device driven in the passive matrix mode requires much power to display a moving picture due to high power consumption. The power consumption becomes more problematic as the size of the electrophoretic display device increases.

The pigment particles contained in the electronic ink of the microcapsules are dispersed in a liquid phase, and the viscosity of liquid contributes to the slow response speed.

SUMMARY OF THE INVENTION

The present invention provides an active-matrix mode electrophoretic display panel that uses an electrophoretic medium with a fast response speed and a method for fabricating the same.

In one aspect, the present invention is an electrophoretic display panel that includes: a first array substrate including a gate line extending in one direction, a data line extending in a direction that is perpendicular to the gate line, a thin film transistor connected to the gate line and the data line, and a pixel electrode electrically connected to the thin film transistor. The display panel includes a second array substrate that is coupled to the first array substrate and including a common electrode capable of forming an electric field with the pixel electrode; a spacer formed on at least one of the first array substrate or the second array substrate to define a charging region in the pixel region; and an electrophoretic medium placed in the charging region between the first and second array substrates.

In another aspect, the present invention is a method of fabricating an electrophoretic display panel. The method entails: forming a first array substrate including a gate line extending in one direction, a data line extending in a direction that is perpendicular to the gate line, a thin film transistor connected to the gate line and the data line, and a pixel electrode electrically connected to the thin film transistor; forming a second array substrate including a common electrode capable of forming an electric field with the pixel electrode; forming a spacer arranged on at least one of the first array substrate or the second array substrate to define a charging region in the pixel region; forming an electrophoretic medium in the charging region; and attaching the first and second array substrates to each other with the electrophoretic medium disposed between them.

BRIEF DESCRIPTION OF THE DRAWINGS

The above and other features of the present invention will be described in reference to exemplary embodiments in the attached drawings, in which.

DETAILED DESCRIPTION OF THE INVENTION

Figure 1:
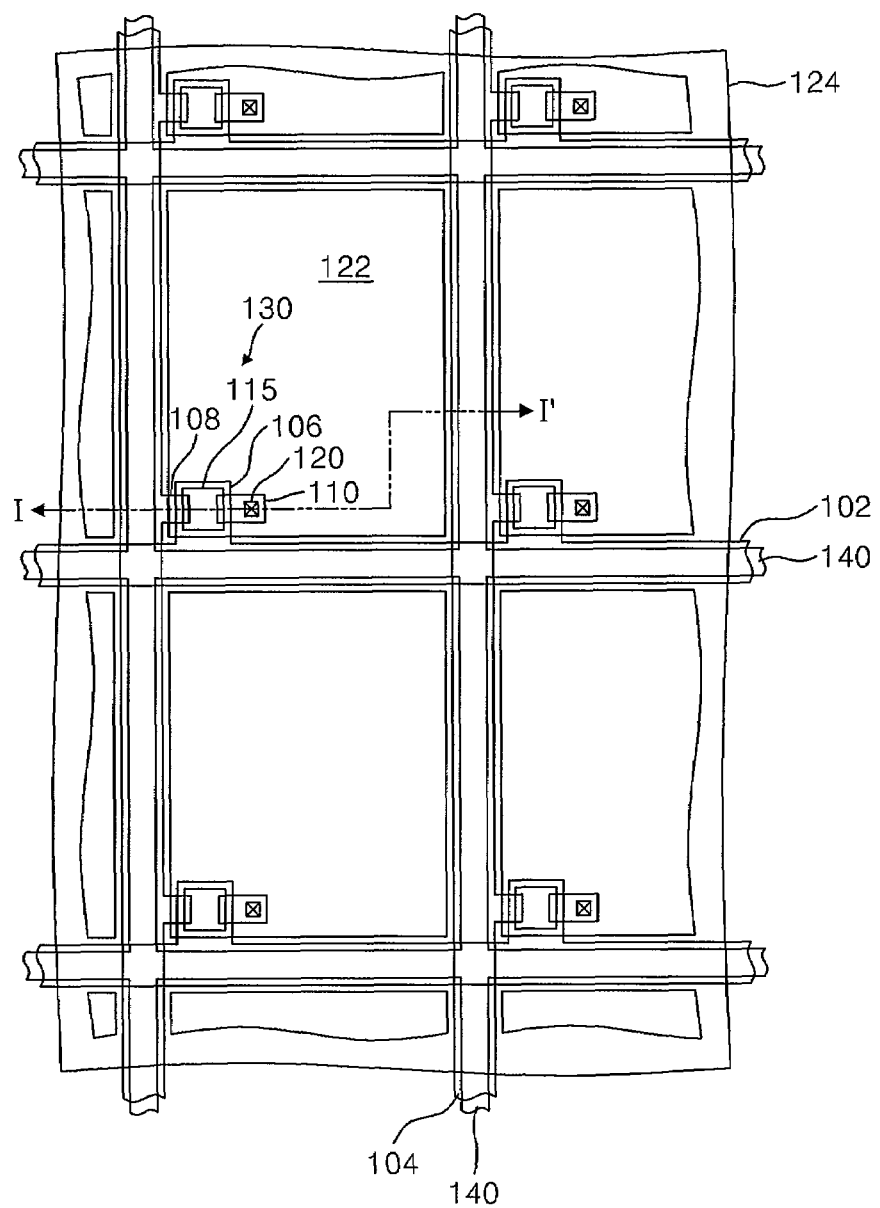
FIG. 1 is a plane view of an electrophoretic display panel according to an exemplary embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
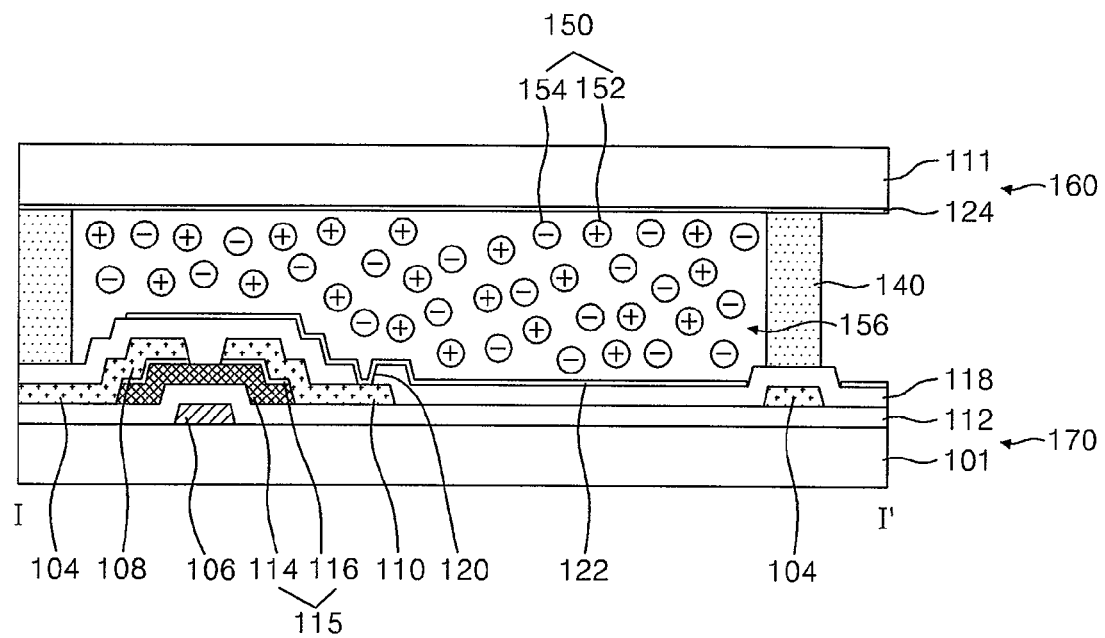
FIG. 2 is a cross-sectional view taken along the line I-I' of FIG. 1.

FIG. 1 is a plan view of an electrophoretic display panel according to an exemplary embodiment of the present invention. FIG. 2 is a cross-sectional view taken along the line I-I' of FIG. 1.

Referring to FIGS. 1 and 2, the electrophoretic display panel has first and second array substrates 160 and 170 with electrophoretic media 150 interposed between them.

The first array substrate 160 includes an upper substrate 111 and a common electrode 124 formed on the upper substrate 111. The common electrode 124 forms an electric field together with a pixel electrode 122, as will be described later.

The upper substrate 111 is made of a transparent material such as transparent glass or plastic to transmit light reflected by the electrophoretic media 150.

The common electrode 124 formed on the upper substrate 111 is made is of a transparent conductive material. The common electrode 124 forms an electric field together with the pixel electrode 122 to drive positively charged pigment particles 152 and negatively charged pigment particles 154.

The second array substrate 170 has a gate line 102 arranged in a transverse direction, a data line 104 arranged in a direction that is perpendicular to the gate line 102, a thin film transistor ("TFT") 130 arranged at a crossing point of the gate line 102 and the data line 104, the pixel electrode 122 electrically connected to the TFT 130, and a spacer 140 for defining a charging region 156 of the electrophoretic media 150.

The TFT 130 selectively supplies a pixel voltage to the pixel electrode 122 from the data line 104 in response to a gate signal transmitted from the gate line 102. The TFT 130 has a gate electrode 106 connected to the gate line 102, a source electrode 108 connected to the data line 104, a drain electrode 110 electrically connected to the pixel electrode 122, and a semiconductor pattern 115. The semiconductor pattern 115 includes an active layer 114 forming a channel area between the source and drain electrodes 108 and 110 and overlapping the gate electrode 106. A gate insulating layer 112 disposed between the active layer 114 and the gate electrode 106 and includes an ohmic contact layer 116 providing ohmic contact between the active layer 114 and the source and drain electrodes 108 and 110. The semiconductor pattern 115 may be formed to overlap the data line 104 when it is formed using the same light exposure mask as the source and drain electrodes 108 and 110.

The pixel electrode 122 is electrically connected to the drain electrode 110 through a contact hole 120 formed in a passivation film 118. The pixel electrode 122 uses a pixel voltage supplied through the TFT 130 to cause an electric potential difference together with a common voltage supplied to the common electrode 124. The pixel electrode 122 is preferably made of an opaque conductive material such as molybdenum (Mo), chromium (Cr), copper (Cu), and aluminum (Al) other than a transparent conductive material such as indium tin oxide (ITO). It is because if the pixel electrode 122 is made of a transparent conductive material, ambient light incident to the pixel electrode 122 passes through the lower substrate 101, thereby leading to light loss.

Figure 5A:
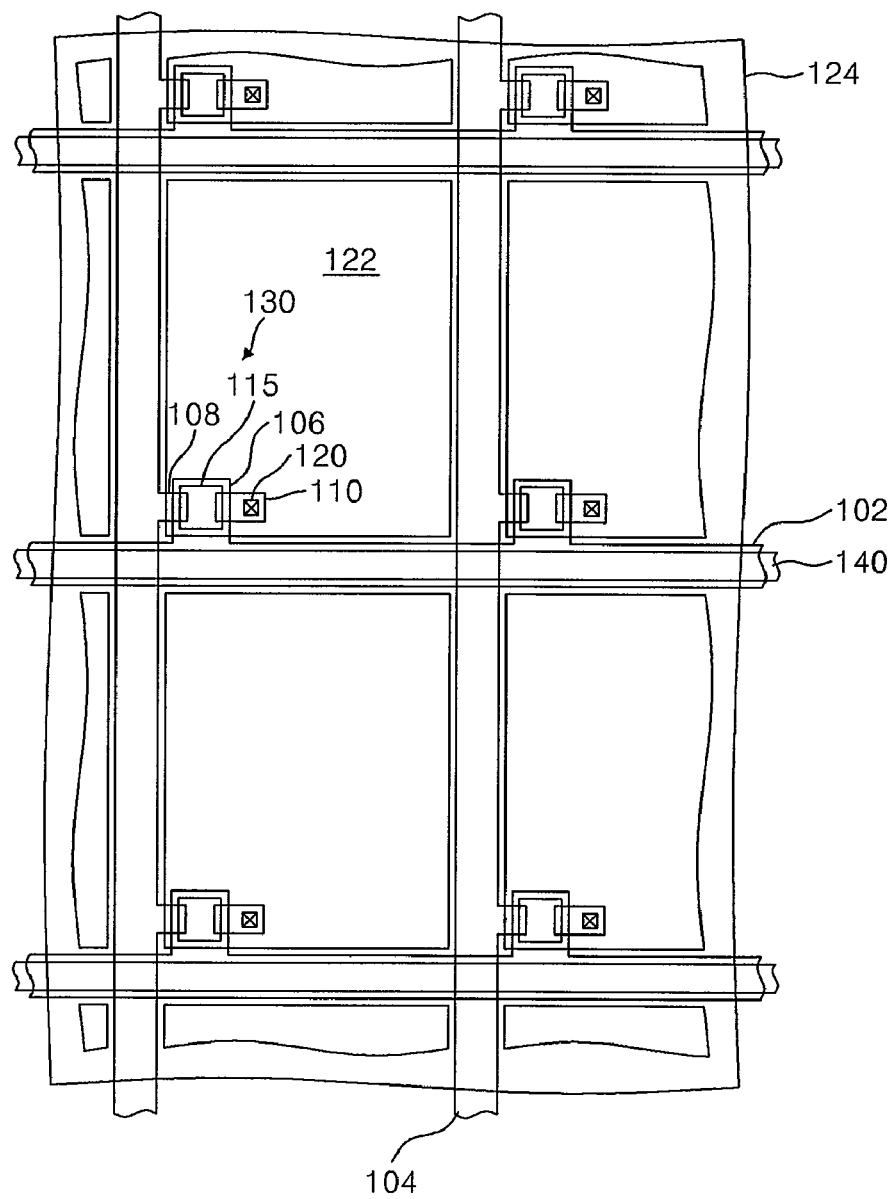
FIGS. 5A and 5B are plane views illustrating a location of a partition wall according to an exemplary embodiment of the present invention.
Figure 5B:
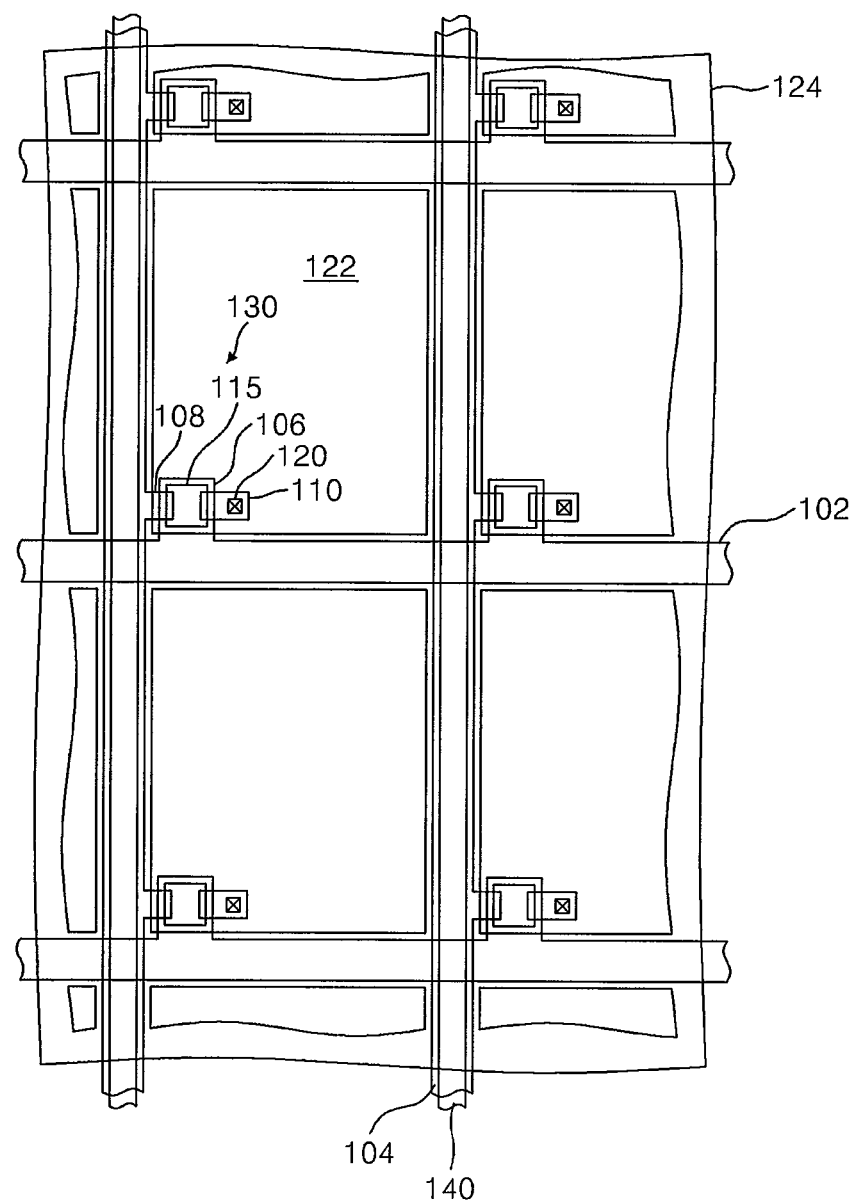

The spacer 140 is made of an organic layer containing a black pigment. For example, the spacer 140 may be made of an acrylic resin having an elastic material. The spacer 140 prevents the first and second array substrates 160 and 170 from breaking and keeps a uniform cell gap between the first and second array substrates 160 and 170 when the first and second array substrates 160 and 170 are attached to each other. The spacer 140 may be formed on the passivation film 118 in various configurations. For example, the spacer 140 may be formed like the gridlines of a lattice, overlapping the gate line 102 and the data line 104, thereby defining the charging region 156 of the electrophoretic media 150. Alternatively, the spacer 140 may be formed in a stripe overlapping the gate line 102 as illustrated in FIG. 5A or overlapping the data line 104 as illustrated in FIG. 5B, thereby defining the charging region 156 of the electrophoretic media 150. As yet another alternative, the spacer 140 may form polygon regions such as triangles, rectangles, circles, ellipses, or hexagons, depending on the shape of the pixel region.

The spacer 140 serves to maintain a cell gap between the upper and lower substrates 111 and 101 to prevent the upper substrate 111 from bending.

Figure 6:
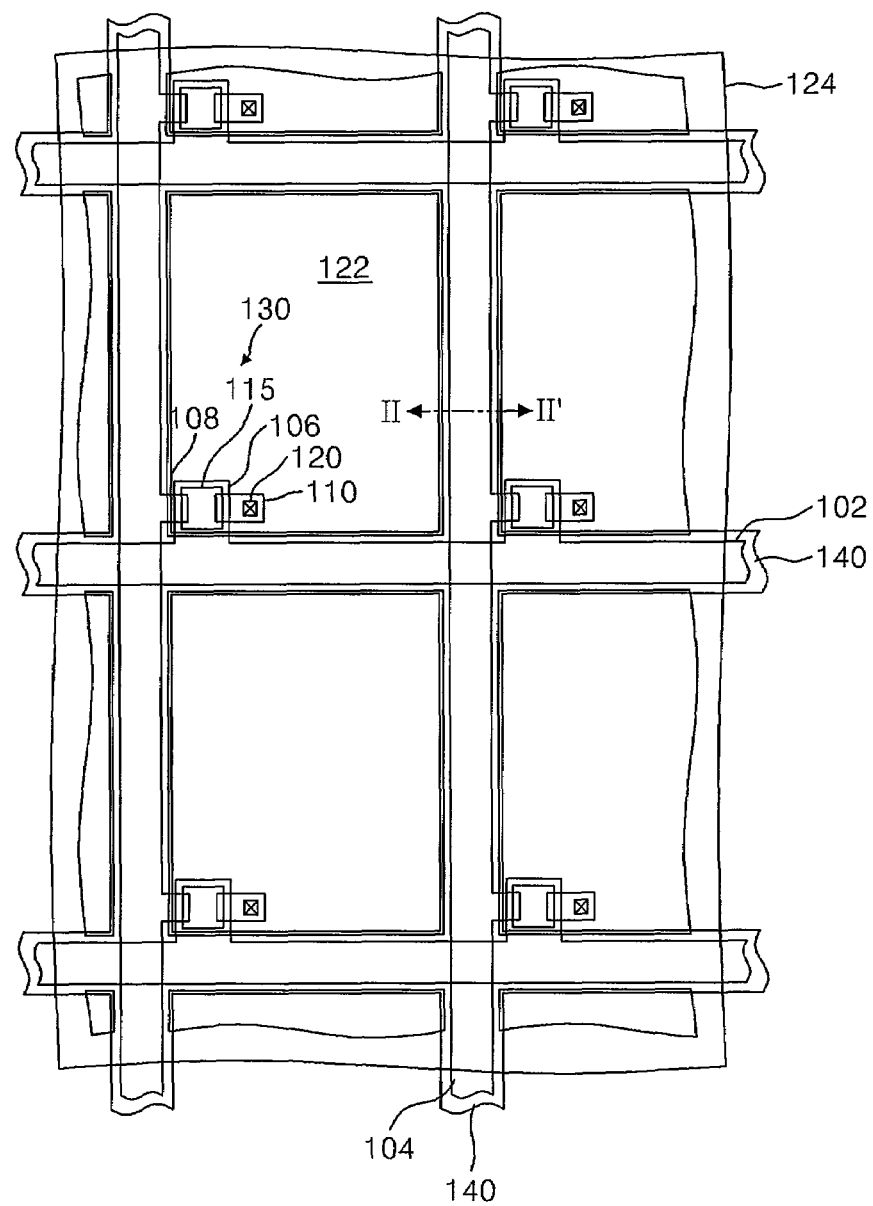
FIG. 6 is a plane view illustrating the width of the spacer according to an exemplary embodiment of the present invention.
Figure 7:
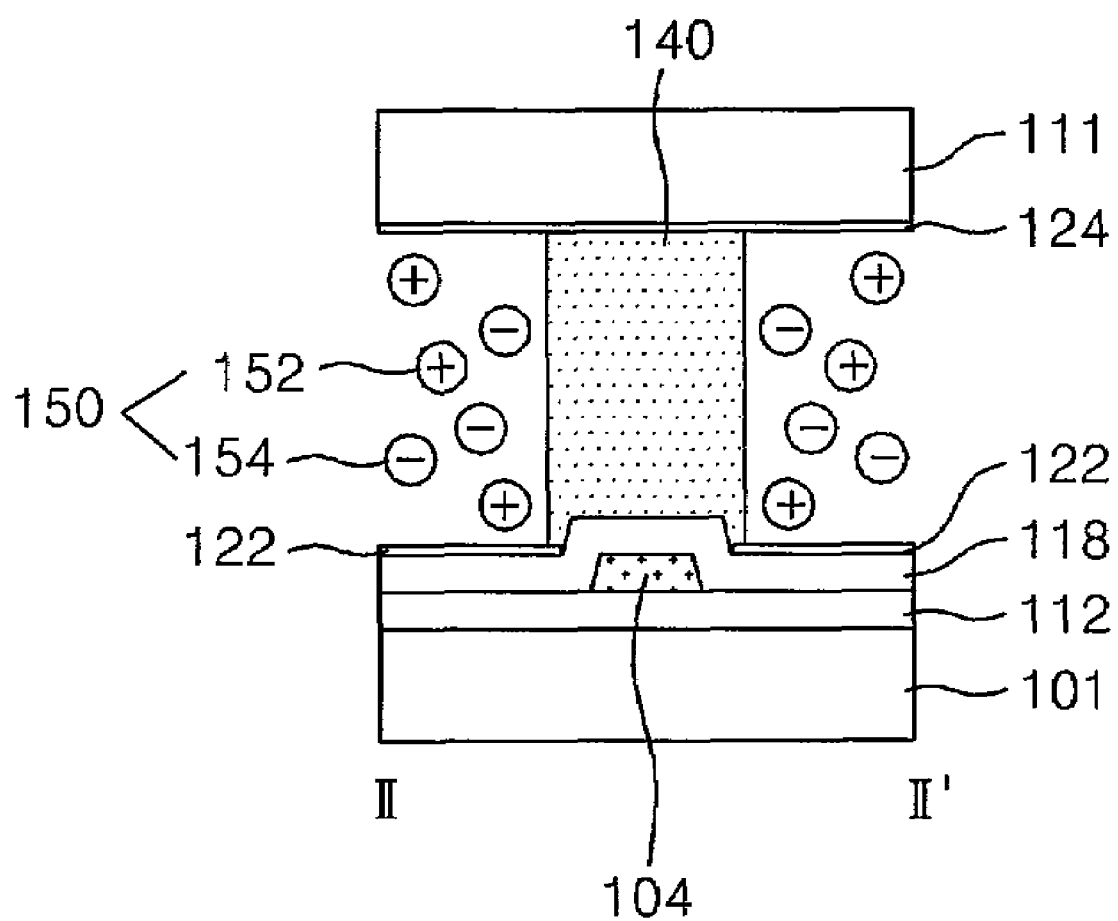
FIG. 7 is a cross-sectional view taken along the line II-II' of FIG. 6.

The spacer 140 may be formed with a width which is less than or larger than the width of at least one of the gate or data lines 102 and 104 as shown in FIGS. 2, 5A, and 5B. For example, when the spacer 140 is formed wider than the data line 104 to overlap the data line 104 as shown in FIGS. 6 and 7, the spacer 140 partially overlaps the pixel electrode 122 located along the two sides of the data line 104. In this instance, when the pixel voltage is supplied to the pixel electrode 122 located at the right (or left) side of the data line 104 from the data line 104, the spacer 140 prevents the electrophoretic media 150 corresponding to the pixel electrode 122 located at the left (or right) side of the data line 104 from overlapping the data line 104. That is, the spacer 140 prevents the electrophoretic media 150 corresponding to the pixel electrode 122 located at the left (or right) side of the data line 104 from moving by the pixel voltage supplied through the data line 104.

The spacer 140 may be formed on the upper substrate 111. In this instance, the spacer 140 is formed on the common electrode 124 to define the pixel region. When the spacer 140 is formed on the upper substrate 111, the charging region 156 corresponding to the pixel region of the lower substrate 101 is formed in the upper substrate 111. The electrophoretic media 150 fill in the charging region 156.

Figure 3:
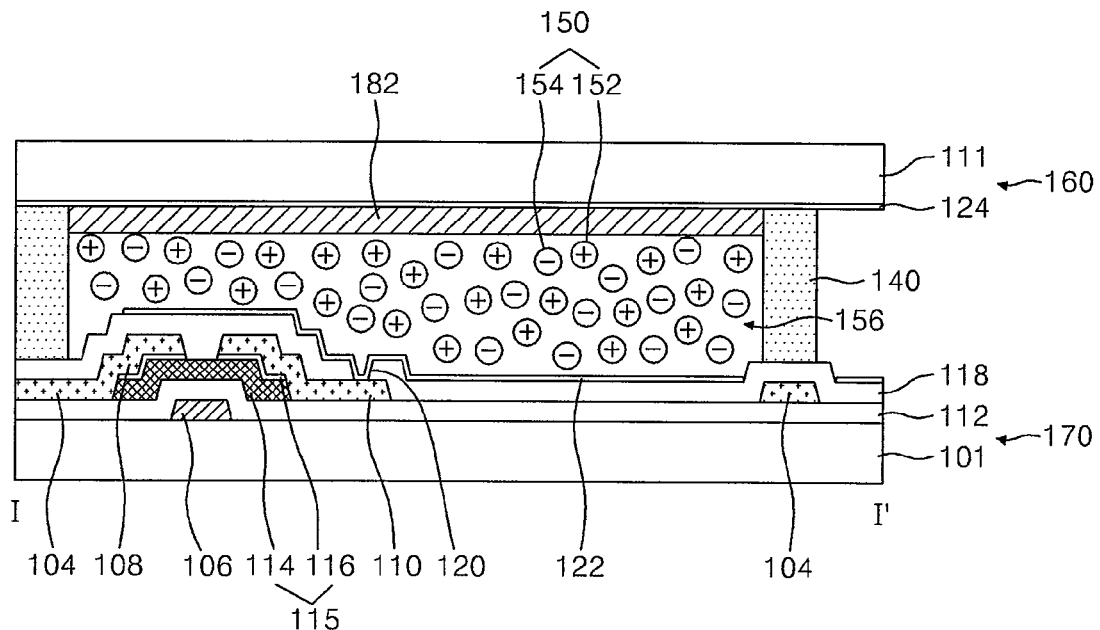
FIG. 3 is a cross-sectional view of an electrophoretic display panel having a color filter according to an embodiment of the present invention.

A color electrophoretic display panel may include a color filter to display a color image. In case where the spacer 140 is formed on the upper substrate 111, as shown in FIG. 3, a color filter 182 is formed in the charging region 156 formed by the spacer 140 before the electrophoretic media 150 are placed on the color filter 182.

Figure 4:
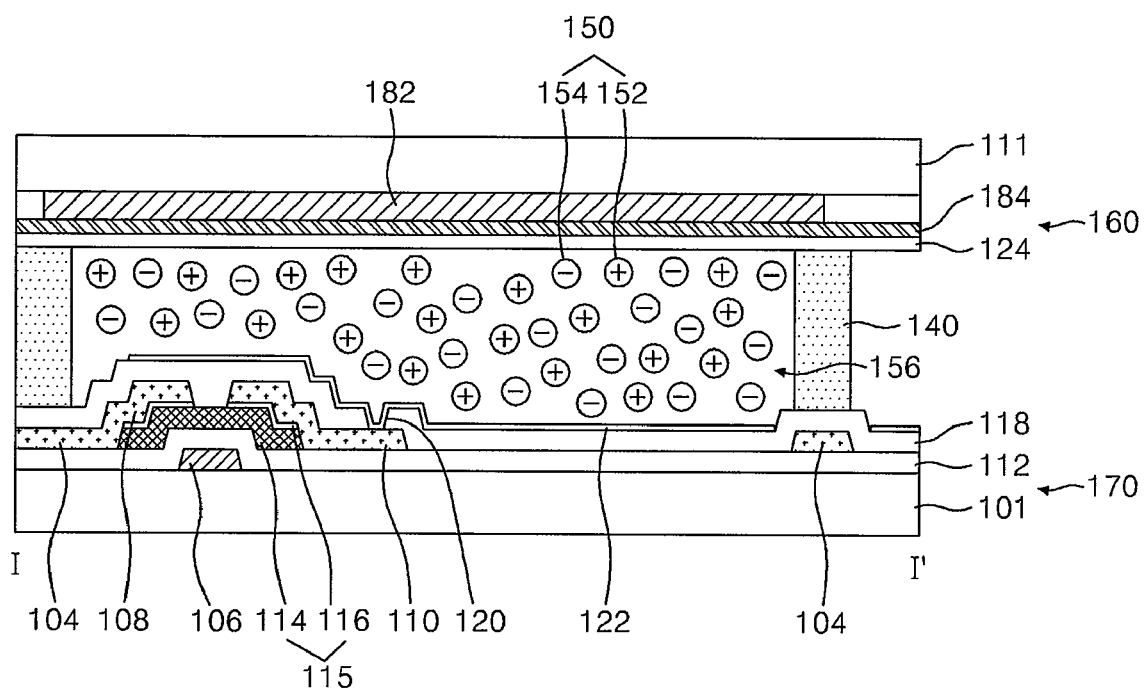
FIG. 4 is a cross-sectional view of an electrophoretic display panel having a color filter according to another exemplary embodiment of the present invention.

As shown in FIG. 4, the color filter 182 may be formed between the upper substrate 111 and the common electrode 124. In this instance, only the electrophoretic media 150 fill the charging region 156 formed by the spacer 140. A planarization film 184 is preferably formed between the color filter 182 and the common electrode 124. A color resistor used for the color filter 182 has lots of concave-convex portions on its surface, and thus the common electrode 124 formed directly on the color filter 182 also has lots of concave-convex portions. The concave-convex portions of the common electrode 124 may cause a short circuit with the pixel electrode 122, and thus the planarization film 184 prevents a possible short circuit problem between the common electrode 124 and the pixel electrode 122.

Figure 8:
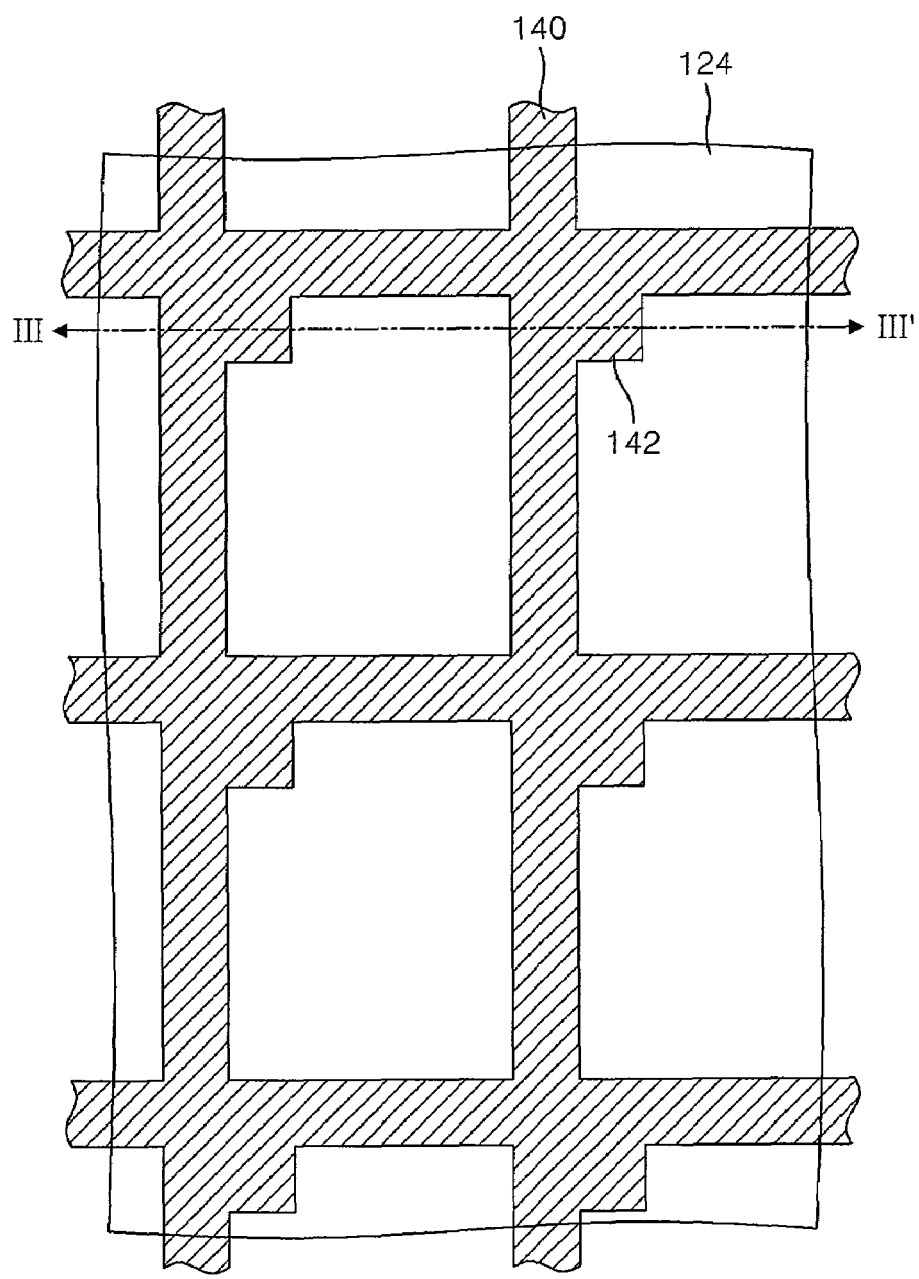
FIG. 8 is a plan view illustrating a spacer having a TFT shielding portion according to another exemplary embodiment of the present invention.
Figure 9:
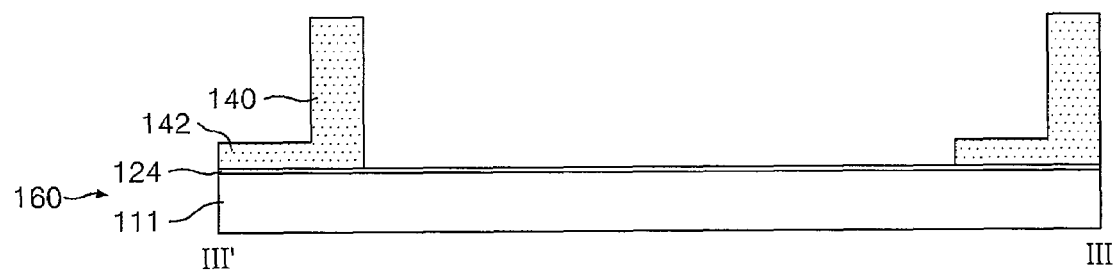
FIG. 9 is a cross-sectional view taken along the line III-III' of FIG. 8.
Figure 10:
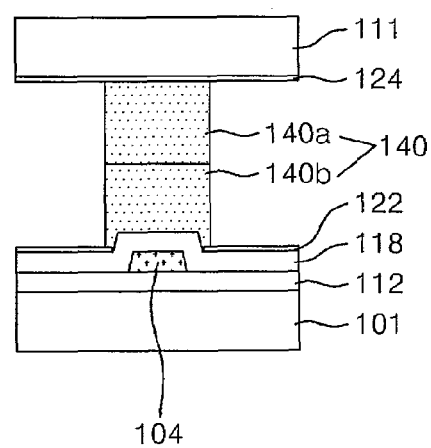
FIG. 10 is a cross-sectional view illustrating a modification of a spacer according to an exemplary embodiment of the present invention.

The spacer 140 may include a first spacer 140a formed on the upper substrate 111 and a second spacer 140b formed on the lower substrate 101 as shown in FIG. 10. Meanwhile, when the TFT 130 is irradiated, this irradiation causes photoleakage in the TFT 130, thereby deteriorating the performance of the TFT 130. The spacer 140 may include a TFT shielding portion 142 which shields the TFT 130 from incident light. As shown in FIGS. 8 and 9, the TFT shielding portion 142 extends from the spacer 140 to cover the TFT 130. The TFT shielding portion 142 is thinner than other portions of the spacer 140. This difference in thickness is because the TFT shielding portion 142 corresponding to the TFT 130 is higher ("upward" with respect to FIG. 9) than the portions corresponding to the gate line 102 and the data line 104.

The electrophoretic media 150 include a positive pigment particle 152 of a black powder form and a negative pigment particle 154 of a white powder form. The electrophoretic media 150 have a faster response speed than the microcapsules containing electronic ink since the pigment particles 152 and 154 move in the charging region 156 of a vapor phase atmosphere formed by the spacer 140.

In the electrophoretic media 150, when an electric potential difference occurs between the pixel electrode 122 and the common electrode 124, the positively charged pigment particles 152 and the negatively charged pigment particles 154 move to the common electrode 124 and the pixel electrode 122 that have opposite polarities, respectively. For example, when the pixel voltage with a positive polarity is applied to the pixel electrode 122 and the common voltage with a negative polarity is applied to the common electrode 124, the positively charged pigment particles 152 move to the common electrode 124, and the negatively charged pigment particles 154 move to the pixel electrode 122. As a result, ambient light is reflected by the negatively charged white pigment particles 154 and the corresponding pixel region implements a white color. On the other hand, when the pixel voltage with a negative polarity is applied to the pixel electrode 122 and the common voltage with a positive polarity is applied to the common electrode 124, the positively charged pigment particles 152 move to the pixel electrode 122, and the negatively charged pigment particles 154 move to the common electrode 124. As a result, ambient light is reflected by the positively charged black pigment particles 152 and the corresponding pixel region implements a black color.

In reference to the exemplary embodiment, the black and white pigment particles 152 and 154 have been described as the electrophoretic media 150. However, this is not a limitation of the invention and the electrophoretic media 150 may include chromatic color pigment particles. Thus, the electrophoretic display panel of the present invention can realize a chromatic color image as well as an achromatic color image.

FIGS. 11A to 11G are cross-sectional views illustrating an exemplary method for fabricating an electrophoretic display panel in accordance with the present invention.

Figure 11A:
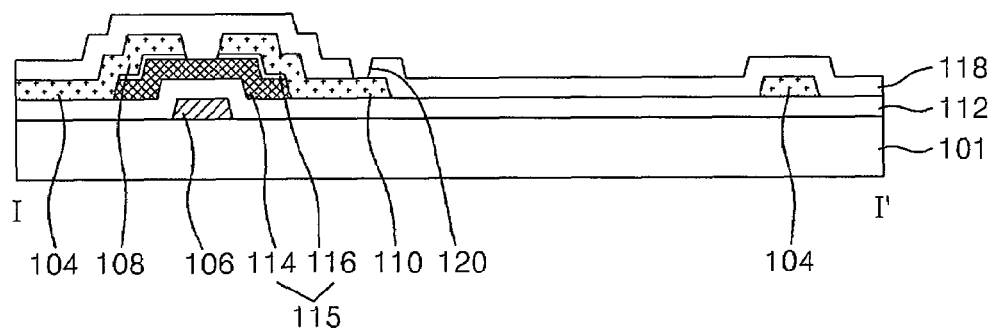
FIG. 11A to 11G are cross-sectional views illustrating an exemplary method for fabricating the electrophoretic display panel in accordance with the present invention.

Referring to FIG. 11A, the TFT 130 having the gate electrode 106, the source electrode 108, the drain electrode 110, the active layer 114, and the ohmic contact layer 116, the data line 104 connected to the source electrode 108, and the passivation film 118 having the contact hole 120 are formed on the lower substrate 101.

More specifically, a gate metal layer is deposited on the lower substrate 101 using a deposition technique such as sputtering. The gate metal layer is patterned by using a photolithography process and an etching process to form the gate electrode 106. The gate electrode 106 may be formed from a low-resistance metal such as molybdenum (Mo), a Mo alloy, chromium (Cr), a Cr alloy, aluminum (Al), an Al alloy, copper (Cu), a Cu alloy, silver (Ag), and an Ag alloy. The gate electrode 106 may have a single- or multi-layer structure.

The gate insulating layer 112, an amorphous silicon layer, and an impurity-doped amorphous silicon layer are sequentially formed on the lower substrate 101 having the gate electrode 106 by using a plasma enhanced chemical vapor deposition (PECVD) or sputtering technique. The amorphous silicon layer and the impurity-doped amorphous silicon layer are then patterned by using a photolithography process and an etching process to form the semiconductor pattern 115 containing the active layer 114 and the ohmic contact layer 116.

A source/drain metal layer is deposited on the lower substrate 101 having the semiconductor pattern 115 by using a PECVD or sputtering technique. The source/drain metal layer may be formed from Al-based metal, Mo-based metal, or Cr-based metal and has a single- or multi-layer structure.

The source/drain metal layer is patterned by using a photolithography process and an etching process to form the data line 104, the source electrode 108, and the drain electrode 110. Then, the ohmic contact layer 116 is subjected to a dry etching process using the source and drain electrodes 108 and 110 as a mask, thereby exposing a channel area of the active layer 114. Here, the data line 104 and the source and drain electrodes 108 and 110 may be formed at the same time as the semiconductor pattern 115 by using the same mask.

An organic or inorganic insulating material layer is coated over the entire surface of the lower substrate 101 having the data line 104 and the source and drain electrodes 108 and 110 to form the passivation film 118. The passivation film 118 is patterned by using a photolithograph process and an etching process to form the contact hole 120 which extends to the drain electrode 110.

Figure 11B:
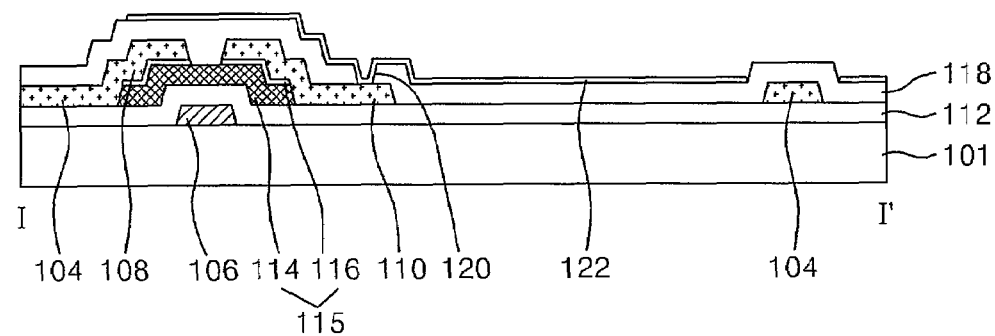

Referring to FIG. 11B, an opaque conductive material layer is deposited on the lower substrate 101 having the passivation film 118 by using a sputtering technique. The opaque conductive material layer is patterned by using a photolithography process and an etching process to form the pixel electrode 122 on each pixel region. The pixel electrode 122 is electrically connected to the exposed portion of the drain electrode 110 via the contact hole 120. The pixel electrode 122 may be formed from Mo, Cr, Cu, or Al.

Figure 11C:
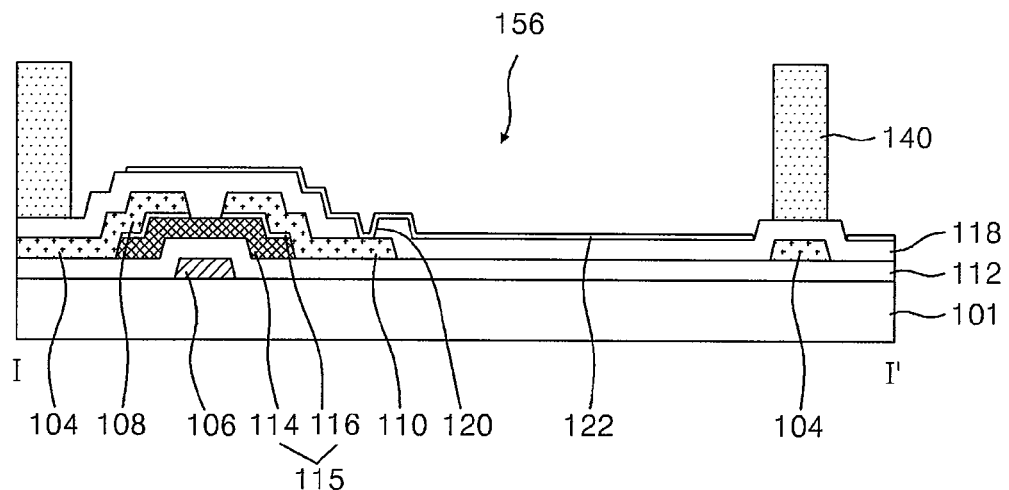

Referring to FIG. 11C, the spacer 140 is formed on the lower substrate 101 having the pixel electrode 122. That is, an organic layer such as an acrylic resin layer is coated on the lower substrate 101 having the pixel electrode 122 and then patterned by using a photolithography process to form the spacer 140.

The spacer 140 may be formed through an imprint process using an imprint mold, a screen printing process using a screen mask, or a sandblasting process using a dry film resister and a sand particle, as well as the photolithography process using a light exposure mask.

Figure 11D:
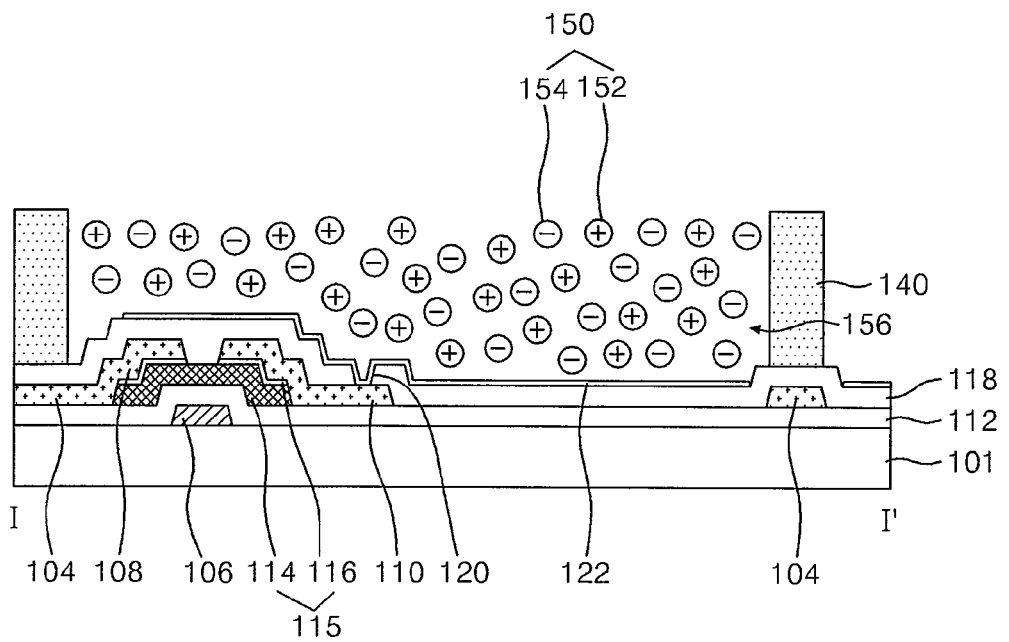

Referring to FIG. 11D, the electrophoretic media 150 are placed on the lower substrate 101 having the spacer 140. More specifically, the positively charged pigment particles 152 and the negatively charged pigment particles 154 in the form of powder are jetted into the charging region 156 formed by the spacer 140 by a printing process using a slit nozzle. Accordingly, the second array substrate 170 is completed.

Subsequently, even though not shown, the common electrode 124 is formed on the upper substrate 111. Here, the common electrode 124 may be formed from a transparent conductive material such as ITO, IZO, or ITZO. Accordingly, the first array substrate 160 is completed.

Figure 11E:
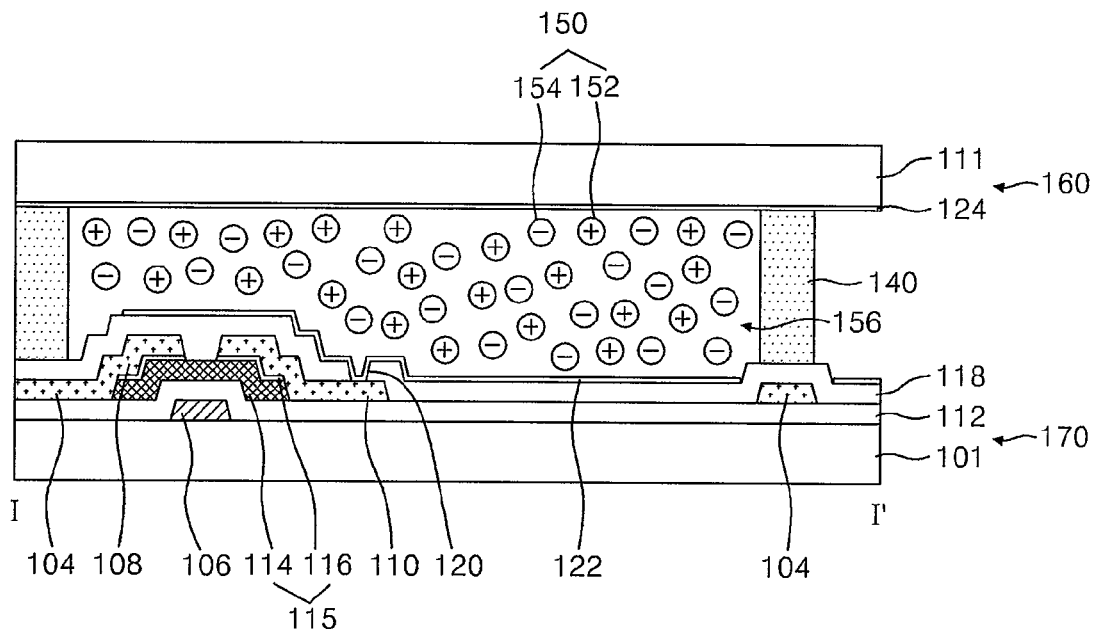

Finally, referring to FIG. 11E, the first and second array substrates 160 and 170 are attached to each other by using an adhesive (not shown), thereby completing the electrophoretic display panel.

Figure 11F:
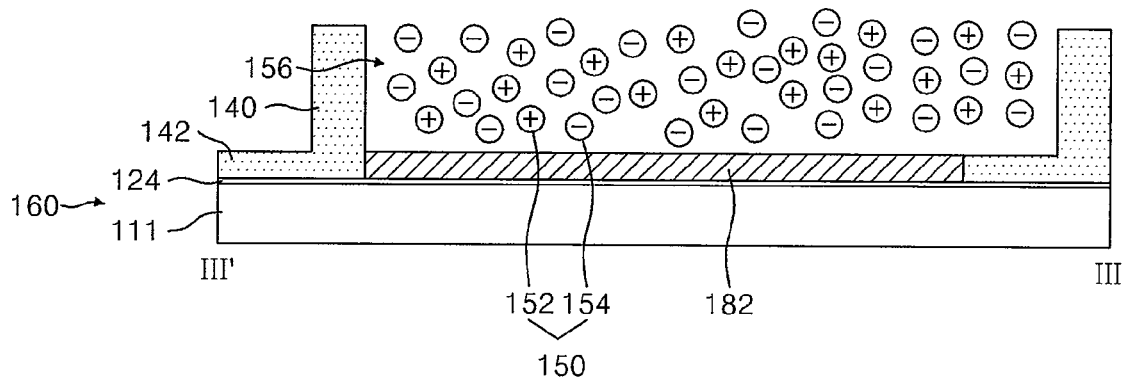
Figure 11G:
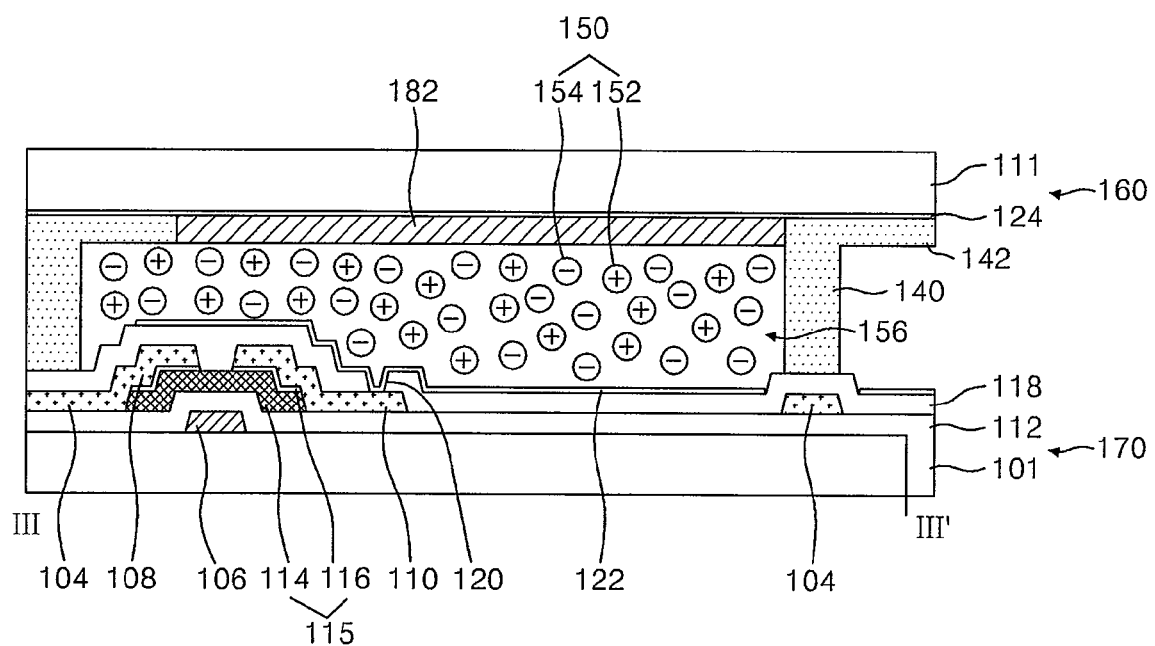

A color filter may be further formed in order to realize a color image. Where the color filter is formed, as shown in FIG. 11F, the spacer 140 having the TFT shielding portion 142 is formed on the common electrode 124 to thereby form the charging region 156. Then, the color filter 182 is formed in the charging region 156. Thereafter, the electrophoretic media 150 are placed on the color filter 182. Accordingly, the first array substrate 160 is completed.

The first array substrate 160 having the color filter 182 is attached to the second array substrate 170, i.e., the lower substrate 101 having the TFT 103 and the pixel electrode 122, thereby completing the assembly of a color electrophoretic display panel.

As described above, the electrophoretic display panel of the present invention is driven by an active matrix method using the TFT, and thus it is easy to realize a moving picture.

Further, the electrophoretic display panel of the present invention has a fast response speed compared to microcapsules containing electronic ink since the pigment particles of the electrophoretic media move in the charging region of a vapor phase atmosphere prepared by the spacer.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. An electrophoretic display panel comprising:
    a first array substrate including a gate line extending in one direction, a data line extending in a direction that is perpendicular to the gate line, a thin film transistor connected to the gate line and the data line, and a pixel electrode electrically connected to the thin film transistor;
    a second array substrate coupled to the first array substrate and including a common electrode that is capable of forming an electric field with the pixel electrode; and
    an eleetrophoretic medium placed in the charging region between the first and second array substrates, wherein the electrophoretic medium comprises pigment particles in a vapor phase atmosphere.

2. The electrophoretic display panel of claim 1, wherein the spacer is shaped like gridlines of a lattice overlapping the gate line and the data line.

3. The electrophoretic display panel of claim 1, wherein the spacer is shaped like a stripe overlapping either the gate line or the data line.

4. The electrophoretic display panel of claim 1, wherein the spacer is wider than at least one of the gate line or the data line.

5. The electrophoretic display panel of claim 4, wherein the spacer overlaps at least one of the data line or the gate line and overlaps a portion of the pixel electrode located next to the data line or the gate line.

6. The electrophoretic display panel of claim 1, wherein the spacer has a thin film transistor shielding portion extending from the spacer to cover the thin film transistor.

7. The electrophoretic display panel of claim 6, wherein the thin film transistor shielding portion is thinner than other portions of the spacer.

8. The electrophoretic display panel of claim 1, wherein the spacer is formed of an organic layer including acrylic resin.

9. The electrophoretic display panel of claim 1, wherein the electrophoretic medium comprises pigment particles are in a form of powder.

10. The electrophoretic display panel of claim 9, wherein the pigment particles move in the charging region of the vapor phase atmosphere.

11. The electrophoretic display panel of claim 1, wherein the pixel electrode comprises an opaque conductive layer formed of molybdenum (Mo), chromium (Cr), copper (Cu), or aluminum (Al).

12. The electrophoretic display panel of claim 1, wherein the second array substrate comprises a color filer formed in a pixel region.

13. The electrophoretic display panel of claim 12, wherein the color filter is formed in a region defined by the spacer that is formed on the common electrode.

14. The electrophoretic display panel of claim 12, wherein the color filter is formed between the second array substrate and the common electrode.

15. The electrophoretic display panel of claim 14, further comprising a planarization film on the color filter.

16. The electrophoretic display panel of claim 15, wherein the planarization film comprises an organic layer.

17. The electrophoretic display panel of claim 1, wherein the pigment particles comprise positively charged pigment particles and negatively charged pigment particles.

18. The electrophoretic display panel of claim 1, further comprising a spacer formed on at least one of the first array substrate and the second array substrate.

19. A method of fabricating an electrophoretic display panel, comprising:
    forming a first array substrate including a gate line extending in one direction, a data line extending in a direction that is perpendicular to the gate line, a thin film transistor connected to the gate line and the data line, and a pixel electrode electrically connected to the thin film transistor;
    forming a second array substrate including a common electrode, wherein the common electrode is capable of forming an electric field with the pixel electrode;
    forming a spacer arranged on at least one of the first array substrate or the second array substrate;
    forming an electrophoretic medium comprising pigment particles in a vapor phase atmosphere on at least one of the first array substrate and the second array substrate; and
    attaching the first and second array substrates to each other with the electrophoretic medium disposed between them.

20. The method of claim 19, wherein forming the spacer comprises shaping the spacer like gridlines of a lattice overlapping the gate line and the data line.

21. The method of claim 19, wherein forming the spacer comprises shaping the spacer like a stripe overlapping the gate line or the data line.

22. The method of claim 19, wherein the spacer overlaps at least one of the data line or the gate line and overlaps a portion of the pixel electrode next to the data line or the gate line.

23. The method of claim 19, wherein forming the spacer comprises forming the spacer of an organic layer including an acrylic resin.

24. The method of claim 19, wherein the pixel electrode comprises an opaque conductive layer formed of molybdenum (Mo), chromium (Cr), copper (Cu), or aluminum (Al).

25. The method of claim 19, wherein the spacer has a thin film transistor shielding portion extending from the spacer to cover the thin film transistor.

26. The method of claim 25, further comprising making the thin film transistor shielding portion thinner than other portions of the spacer by using a partial light exposure method.

* * * * *